United States Patent [19]

Boutin

[11] Patent Number: 4,987,919

[45] Date of Patent: Jan. 29, 1991

[54] PNEUMATICALLY ACTIVATED DRAIN VALVE FOR COMPRESSED AIR

[75] Inventor: Francois Boutin, Ste Elie d'Orford, Canada

[73] Assignee: Lucien Orichefsky, Sherbrooke, Canada

[21] Appl. No.: 390,858

[22] Filed: Aug. 8, 1989

[51] Int. Cl.⁵ ............................................. B01D 17/025
[52] U.S. Cl. ......................................... 137/204; 251/63
[58] Field of Search .................. 137/204, 203; 251/63

[56] References Cited

U.S. PATENT DOCUMENTS

| | | |
|---|---|---|
| 2,100,485 | 11/1937 | Lindemann . |
| 2,330,027 | 9/1943 | Churchman ........................ 137/204 |
| 2,462,614 | 2/1949 | DeWitt . |
| 2,602,462 | 7/1952 | Barrett ................................ 137/204 |
| 3,014,687 | 12/1961 | Keisling ........................ 137/204 X |
| 3,486,303 | 12/1969 | Glass et al. . |
| 4,145,025 | 3/1979 | Bergeron ............................. 251/63 |
| 4,239,058 | 12/1980 | Peters .................................. 251/63 X |

Primary Examiner—Alan Cohan
Attorney, Agent, or Firm—Edwin E. Greigg

[57] ABSTRACT

A drain valve for a compressed air tank is pneumatically activated by the residual air which is released from an air compressor when the air compressor comes to a stop after an active cycle. The invention allows for consistent and reliable draining of condensation from a compressed air tank. The energy of the residual air released is used to operate the valve. Under favorable conditions, the valve is operated at a frequency proportional to the rate of moisture condensation.

5 Claims, 2 Drawing Sheets

PNEUMATICALLY ACTIVATED DRAIN VALVE FOR COMPRESSED AIR

BACKGROUND OF THE INVENTION (a) Field of the invention

The present invention relates to a pneumatically activated moisture drain valve for use in a compressed air supply system.

(b) Brief description of the Prior Art

It is known in the art of air compressors that the condensation of moisture in the compressed air is a problem. Most compressed air storage tanks must be provided with drain valves in order to allow the tank to be regularly drained.

Means for automatically draining moisture from a compressed air system have been proposed. However, all involve either a complicated valve and control means or the regular leakage of compressed air from the system.

U.S. Pat. No. 2,100,485 describes a drain valve which effects a continuous but slow draining of a compressed air reservoir. U.S. Pat. Nos. 2,462,614 and 3,486,303 both describe drainage systems for air compressor systems which involve the use of sophisticated timer means which activate the drain valve.

SUMMARY OF THE INVENTION

It is an object of the present invention to provide a moisture drain valve for an air compressor tank which does not require timing means and does not cause continuous draining of the compressed air tank.

It is another object of the invention to provide a drain valve which can be constructed economically and installed into any existing air compressor system without difficulty.

The drain valve according to the present invention is intended to be used in an air compressor system of the type wherein the compressor is driven intermittently in order to raise the pressure of a pressurized air storage tank to a predetermined pressure, at which point the operation of the compressor is halted. It is common among air compressors that the air in the compression cylinders at the time when the compressors stops, is released to the atmosphere. The present invention utilizes this intermittently released air to open the drain valve. The drain valve according to the present invention is, in most circumstances, put into use with a frequency proportional to the amount of air compressed and therefore the amount of moisture generated.

More particularly, the invention provides a moisture drain valve for use in a compressed air system including an air compressor, a compressed air storage tank fed by the compressor, and a pressure release system for releasing residual compressed air from the compressor when the operation of the compressor is halted. The drain valve comprises an inlet for receiving condensed moisture from the compressed air system, an outlet to drain the moisture, valve means for reversably connecting the inlet to the outlet, and activating means connected to the pressure release system to tap residual compressed air from the compressor for activating the valve means and releasing the residual compressed air.

Other objects and advantages of the invention will be apparent from the following more restrictive description of a preferred embodiment with reference to the drawings.

DETAILED DESCRIPTION OF A PREFERRED EMBODIMENT

Figure 2:
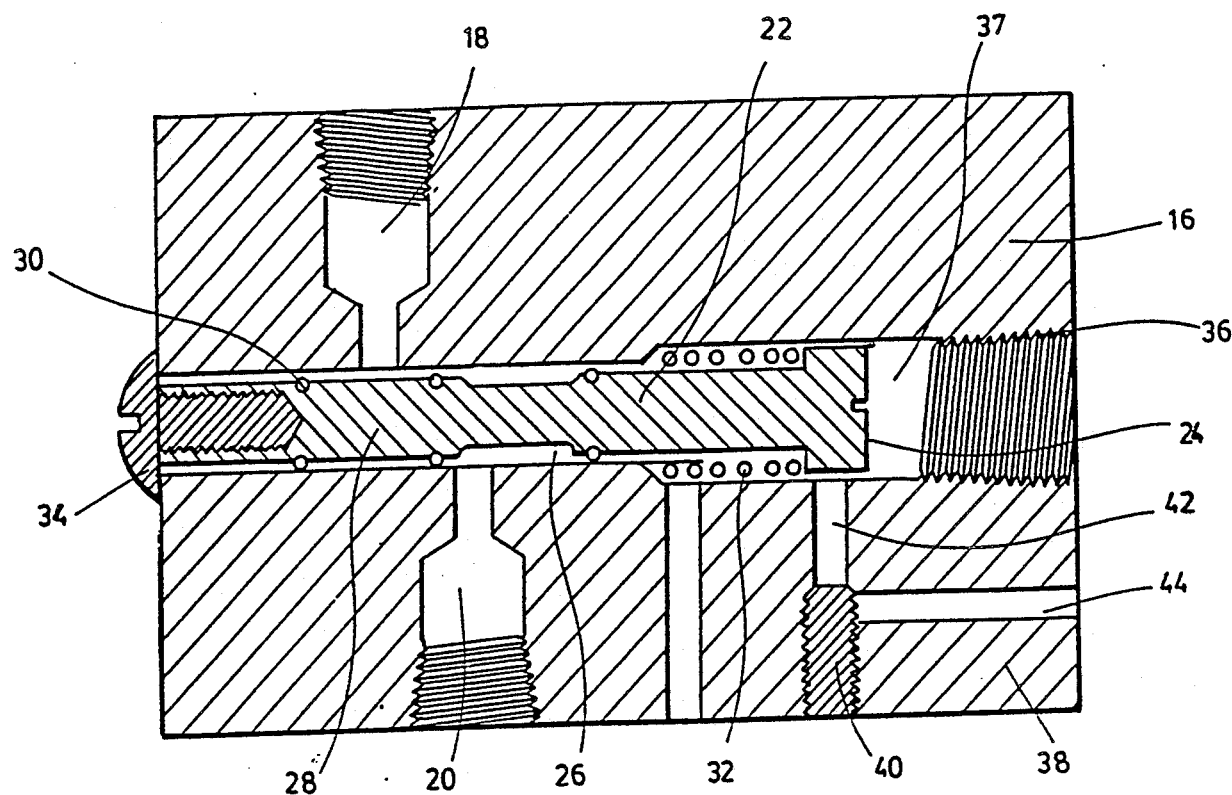
FIG. 2 is a cross-sectional view of a drain valve according to the invention, showing the valve in closed position.
Figure 3:
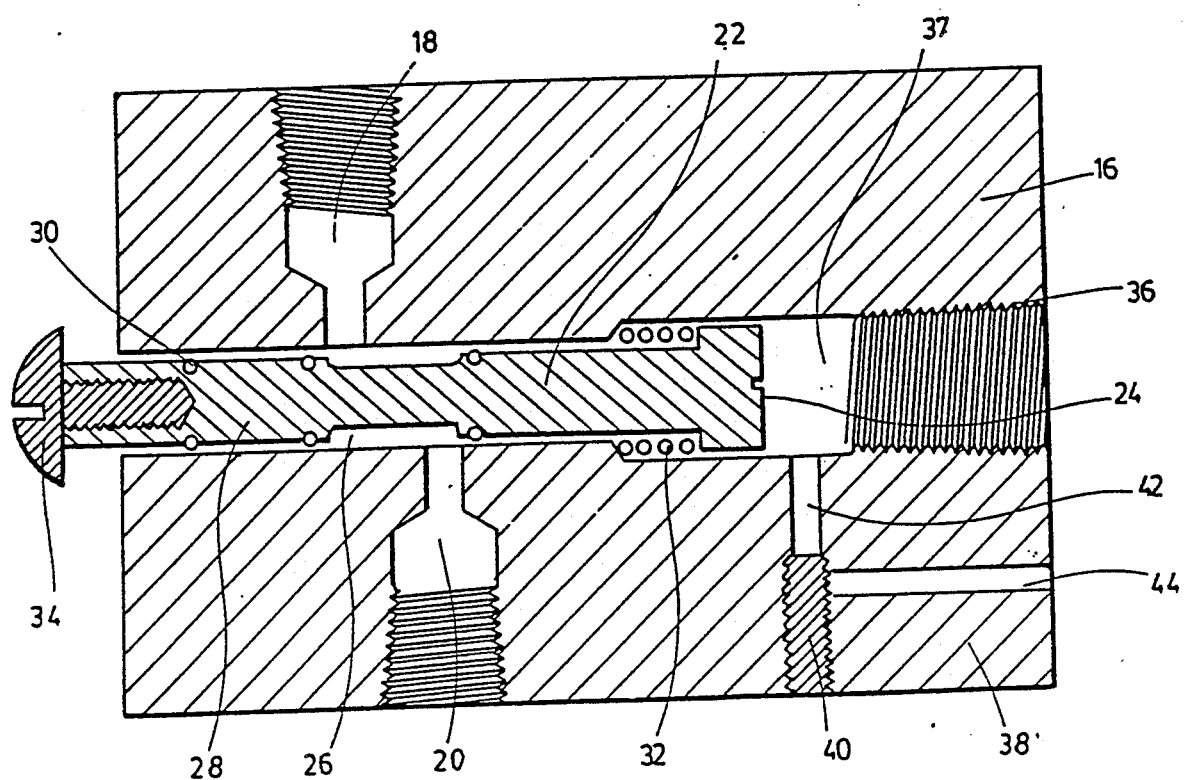
FIG. 3 is a cross-sectional view similar to the one of FIG. 2, showing the valve in open position.

FIGS. 2 and 3 show a drain valve 16 according to the invention, made of a block of say, aluminum, brass or plastic, in which are machined a moisture inlet 18, a moisture outlet 20 and a cylindrical cavity 26 intersecting both the inlet and outlet. A valve 22 including a cylindrical valve body 28 is slidably mounted in the cylindrical cavity 26 the outlet of which forms the port 36. The valve 22 is sealed by 0-rings 30 which lie in circumferential grooves in the body 28 of the valve 22. A return spring 32 is mounted in the cavity 26, opposite to the port 36, to maintain the valve 28 in a position where it prevents any communication between the inlet 18 and outlet 20. This position will be hereinafter referred to as "the closed position". The spring 32 is retained in the cavity by an adjustable retaining screw 34.

Figure 1:
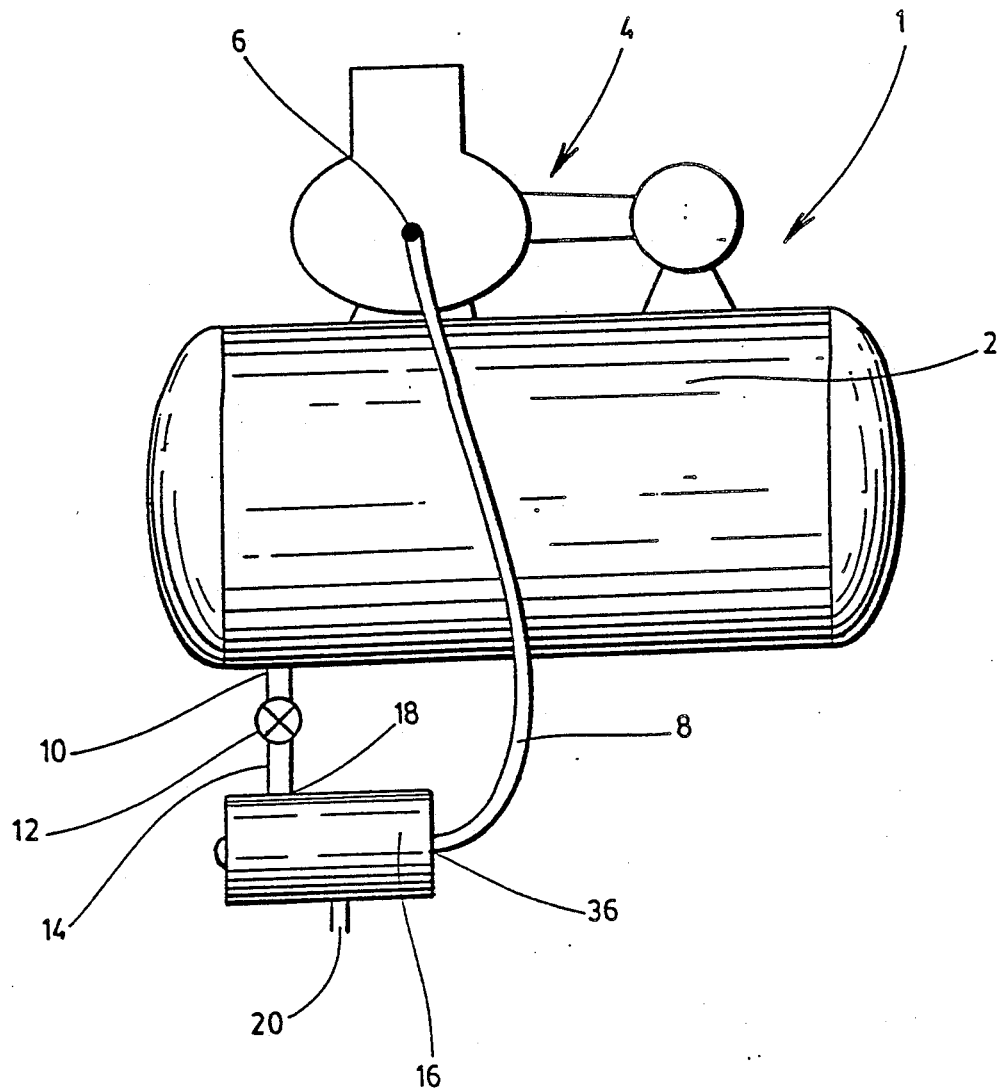
FIG. 1 shows an air compressor system provided with a moisture drain valve according to the invention.

The drain valve 16 is intended to be used in an air compressor system of conventional structure, as is shown in FIG. 1.

The system includes an air compressor 4 and a compressed air storage tank 2. The air compressor 4 includes a pressure release system (not shown) for releasing residual compressed air from the air compressor 4 when operation thereof is stopped after the tank 2 is pressurized sufficiently. The pressure release system, which is know per se and may be, for example, centrifugally operated, releases the residual compressed air through a port 6. Port 6 is connected via a pipe or hose 8 to the port 36 of the drain valve 16.

In use, moisture condenses in the tank 2 and collects at the bottom thereof. A drain port 10 is provided in the tank to allow for the condensed moisture to be drained. The port 10 is connected to the inlet 18 of the drain valve 16 by a valve 12 and a bushing 14. As a result, when the drain valve 16 is activated the condensed moisture will be allowed to drain through outlet 20. Such an activation with occur when residual air pressure at the end of the compressing cycle is applied to the end 24 of the valve 22, which may be in the shape of a piston head. Then, the valve body 28 will be caused to slide from the closed position as shown in FIG. 2 to the open position as shown in FIG. 3, causing the spring 32 to be depressed, and the cavity 26 to join the inlet 18 and the outlet 20.

When the valve 22 is in the closed position, there is little escape for the air pressure applied to the piston 24. However as the valve 22 begins to open, an may be allowed to escape by release means 38 comprising a release duct 42 intersecting the cavity 36. As soon as this duct 42 is uncovered, air pressure is allowed to be released through the duct 42 which is provided with, an adjustment screw 40, and through an outlet 44. The adjustment screw 40 allows adjustment of the air release rate and thereby of the length of time valve is maintained in the open position. The piston 24 of the valve 22 does not make a perfect seal with the position 37 of the cavity 36 in which it moves. This allows for any air pressure remaining after the valve 22 has been opened and closed to be released at a trickle rate through the release means 38 so that all of the residual air pressure which is released after an operation cycle of the compressor 4 may be properly released to the ambient.

As is obvious to one skilled in the art, the present invention may be constructed differently from the preferred embodiment. For example, the moisture may be drained from any component of an air compressor system where moisture is condensed and collected. Other valve means, and means to use the residual air pressure to activate the valve means may be used. These other embodiments are to be considered within the scope of the present invention as defined in the following claims unless they depart therefrom.

What is claimed is:

1. A moisture drain valve for use in a compressed air system including an air compressor, a compressed air storage tank fed by said compressor, and a pressure release system for releasing residual compressed air from said compressor when operation thereof is halted, said drain valve comprising:

an inlet for receiving condensed moisture from said system;
   an outlet to drain said moisture; and
   slide valve means for reversably connecting said inlet to said outlet, said valve means mounted in a cavity intersecting said inlet and outlet, and comprising return spring means located in said cavity at one end of said slide valve to bias said slide valve in closed position, a piston connected to said slide valve at said one end responsive to said residual compressed air to open said slide valve against said spring means, an opposite end of said slide valve having an adjustable retaining screw threaded therein for adjustably retaining said slide valve in an initial position against action of said spring means, a first O-ring located near said other end, a second O-ring located near said one end, and a third middle O-ring located between said first and said second O-rings, each said O-ring being arranged around a circumference of said body and making slideable sealing contact with a wall of said cavity, said inlet communicating with said cavity between said first and middle O-rings when said slide valve is in said initial position, and said outlet communicating with said cavity between said middle and second O-rings when said slide valve is in said initial position.

2. A moisture drain valve according to claim 1, wherein said inlet is connected to the bottom of said tank.

3. A moisture drain valve according to claim 1, further comprising means in said cavity for releasing said residual compressed air to the ambient once said piston has been moved against the action of said return spring means.

4. A moisture drain valve according to claim 3, wherein said means for releasing said residual compressed air to the ambient comprises means for adjusting the rate at which said compressed air is released, whereby the length of time said valve means are activated.

5. A moisture drain valve according to claim 4, wherein said inlet is connected to the bottom of said tank.

* * * * *